United States Patent
Peter et al.

(10) Patent No.: US 6,729,867 B2
(45) Date of Patent: May 4, 2004

(54) DEVICE FOR MANUFACTURING A FLEXIBLE STRIP OF AT LEAST TWO DIFFERENT MASSES FLOWABLE WITH THE ADDITION OF HEAT

(75) Inventors: Alois Peter, Wil (CH); Andreas Egli, Gähwil (CH)

(73) Assignee: Swiss Caps Rechte und Lizenzen AG, Kirchberg (CH)

( * ) Notice: Subject to any disclaimer, the term of this patent is extended or adjusted under 35 U.S.C. 154(b) by 225 days.

(21) Appl. No.: 09/842,175

(22) Filed: Apr. 26, 2001

(65) Prior Publication Data

US 2001/0038160 A1 Nov. 8, 2001

(30) Foreign Application Priority Data

May 3, 2000 (EP) .............................. 00810374

(51) Int. Cl.[7] .............................. B29C 47/06
(52) U.S. Cl. .................. 425/132; 425/133.5; 425/224; 425/374; 425/462; 425/466
(58) Field of Search ................ 425/130, 132, 425/133.5, 224, 374, 462, 466

(56) References Cited

U.S. PATENT DOCUMENTS

| | | | |
|---|---|---|---|
| 3,274,646 A | * | 9/1966 | Krystof .................. 425/131.1 |
| 3,473,193 A | * | 10/1969 | Quackenbush et al. .. 425/131.1 |
| 3,565,737 A | | 2/1971 | Lefevre et al. |
| 3,792,945 A | | 2/1974 | Randall |
| 3,799,718 A | | 3/1974 | Kiyono et al. |
| 3,840,311 A | * | 10/1974 | Wight ...................... 425/131.1 |
| 4,128,386 A | | 12/1978 | Wissinger et al. |
| 4,185,951 A | * | 1/1980 | Webermeier et al. .... 425/133.5 |
| 4,316,868 A | | 2/1982 | Esposito et al. |
| 4,631,016 A | * | 12/1986 | Hay, II ....................... 425/224 |
| 5,282,731 A | | 2/1994 | Dinter |
| 5,316,703 A | * | 5/1994 | Schrenk ................... 425/133.5 |
| 5,429,856 A | | 7/1995 | Krueger et al. |
| 5,672,300 A | * | 9/1997 | Schurig et al. .......... 425/133.5 |
| 6,022,499 A | | 2/2000 | Schurig et al. |

FOREIGN PATENT DOCUMENTS

WO 94/03316 2/1994

* cited by examiner

Primary Examiner—Robert Davis
Assistant Examiner—Joseph S. Del Sole
(74) Attorney, Agent, or Firm—Nath & Associates PLLC; Marvin C. Berkowitz; Derek Richmond

(57) ABSTRACT

A strip casting device (2) has a casting container (14) from which through a casting gap (15) two different masses (12, 13) of a material flowable with the addition of heat are poured out as a strip (3) onto a cooling device (4). The second mass (13) is at the same time ejected by way of injection nozzles (21, 22) into the region of the casting gap (15) into the casting flow of the first mass (12). The injection nozzles are preferably movable in various directions.

15 Claims, 5 Drawing Sheets

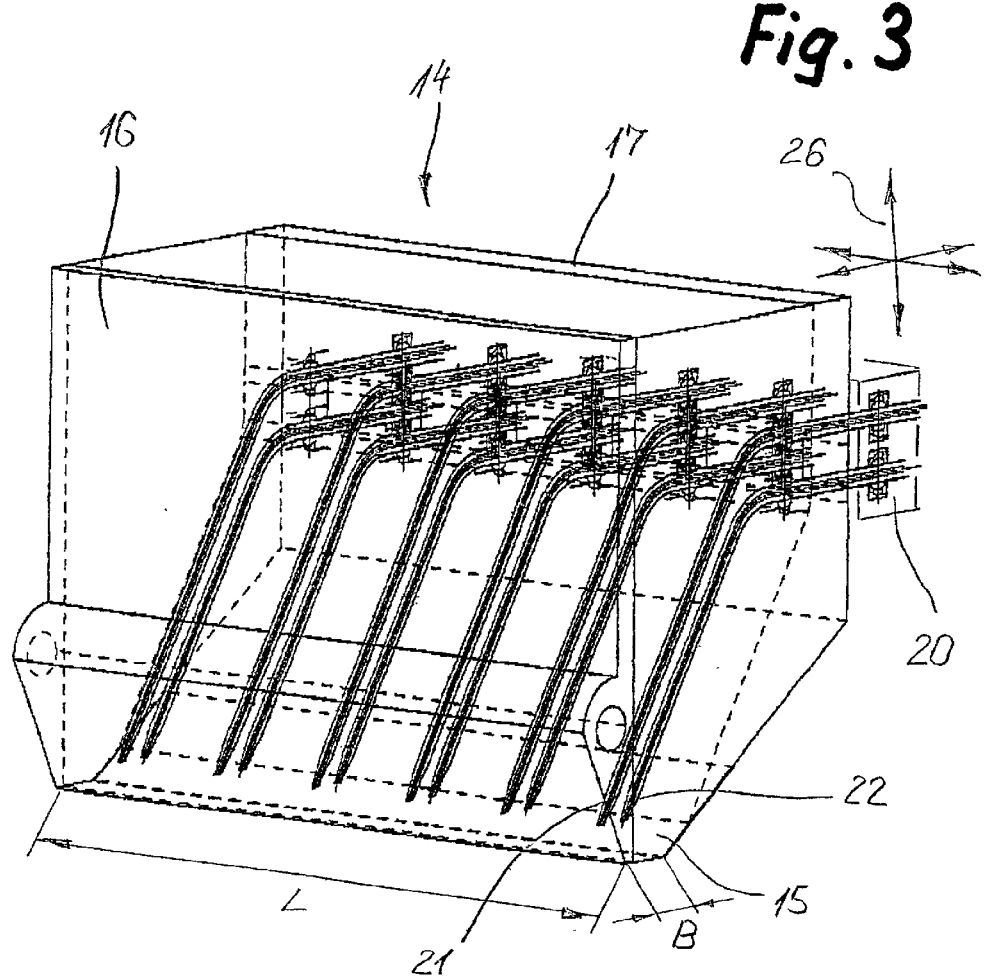
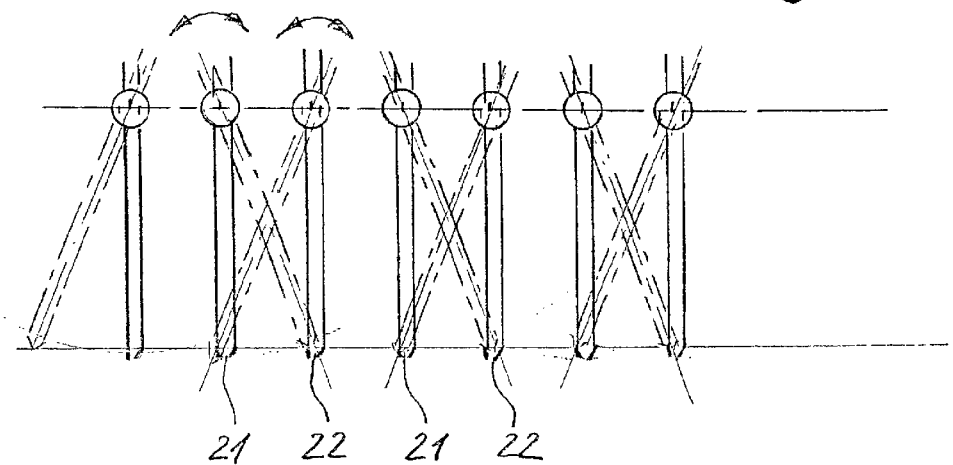

DEVICE FOR MANUFACTURING A FLEXIBLE STRIP OF AT LEAST TWO DIFFERENT MASSES FLOWABLE WITH THE ADDITION OF HEAT

A method and a device for manufacturing a flexible strip of at least two different masses flowable with the addition of heat. The invention relates to a method and a device for manufacturing a flexible strip of at least two different masses flowable with the addition of heat. The manufacture of such strips with the help of a strip casting device in a continuous method is, for example, a method step with the manufacture of soft gelatine capsules. By way of the use of differently colored gelatine masses, it is possible at the same time to achieve a certain pattern on the capsule casing.

BACKGROUND OF THE INVENTION

By way of EP B1 653 979 (=WO 94/03316) there is known a comparable method of the known type with which the two different masses are poured out from a first and from a second application box. The second application box is at the same time positioned within the first application box such that the outer surface of the second application box and an inner surface of the first application box define a gap through which the first flowable gelatine mass may flow so that there arises a base gelatine strip. The second application box comprises at least one opening through which the second flowable gelatine mass may flow onto a part of the base gelatine strip so that there arises a patterned gelatine strip. A disadvantage of this method lies in the fact that the second mass is deposited onto the surface of the already completed formed strip of the first mass, since immediately after leaving the casting gap a cooling on the surface takes place.

A further disadvantage of the known method however lies in the fact that the possibilities for the patterning are greatly restricted and that practically only parallelly aligned patterns may be cast.

BRIEF SUMMARY OF THE INVENTION

It is therefore the object of the invention to provide a method of the previously mentioned type with which, with simple design means, as homogeneous as possible patterned strip may be manufactured, wherein also complicated patterns may be realised. The device is to be as simple as possible in its handling and maintenance.

With the method according to the invention the two masses are not cast onto one another in layers from two separate casting openings bordering one another. Rather the second mass in the region within the casting gap, with the help of an injection nozzle is injected into the casting flow of the first mass. At the same time the first mass envelops the second mass completely or partly respectively the casting gap surrounds the opening of the injection nozzles completely or partly. On the one hand this leads to the fact that the second mass is practically completely enveloped by the firt mass. The coming-together of the two masses at the same time furthermore takes place at a location at which the casting flow does not yet come into contact with the surrounding air. This leads to a homogeneous combining of the two casting flows and thus in total to a homogeneous strip which subsequently may be processed without problem. Simultaneously the ejection of the second mass by way of an injection nozzle also however permits varied possibilities for forming differing patterns.

The ejection of the second mass may for example be effected intermittently so that the ejected material flow is partly interrupted. With this there may theoretically be manufactured strips with a point pattern or also "leopard" pattern.

Particularly interesting patterns may be drawn when the injection nozzles are moved during the ejection of the second mass. With this wave lines, serpentine lines but also closed loops and likewise may be drawn.

Particularly advantageously, with respect to the longitudinal direction of the casting gap, from several injection nozzles at least one second mass is ejected, wherein the injection nozzles are moved in opposite directions in a manner such that the material flows of the second mass intersect.

With such a guiding of the nozzles, intersecting lines may be produced on the strip. With this the only precondition is that the injection nozzles with the movement do not collide in that they for example are moved to one another in different planes or in an arc-shaped manner.

Finally it is also conceivable that with respect to the width of the casting gap from at least two injection nozzles arranged next to one another at least one second mass is ejected. This broadens the variety of possible patterns even further and it is furthermore also possible in the advance direction of the strip to permanently or temporarily improve the metering of the quantity of the second mass. Of course also however two different masses may be ejected so that the pattern comprises for example a different color on the front side and on the rear side of the strip.

The method is finally advantageously applied as a part of a capsule manufacturing method for manufacturing patterned soft capsules of two flexible strips with the rotary die method. With this it need not compellingly be the case of gelatine. Also other biopolymer masses may in the same manner be processed into capsules. The method is not only suitable for manufacturing patterned capsules but for example also for other products manufactured of a strip-like intermediate product, such as e.g. deep-drawn packaging inlays, bags and much more. The difference between the masses does not necessarily need to be restricted to the different color. It would indeed also be conceivable to combine masses of the same color but with different material properties, e.g. a mass with flourescing color pigments or a mass with different strength properties for producing a break-off location, and much more. Furthermore as many different masses may be ejected into the casting gap as are present injection nozzles.

The opening of the injection nozzle opens out within the casting gap, wherein it is preferably displaced back somewhat with respect to the plane of the casting gap.

The movable mounting of the injection nozzle in the casting container may be achieved in different ways. Particularly advantageously however the injection nozzle is arranged at the end of a supply tube which is led through a side wall of the casting container and which is linkedly mounted on this. In this manner also whole rows of injection nozzles may be mounted next to one another. As a bearing joint there serves for example a ball-and-socket joint so that the nozzles may also be pivoted circularly.

The supply tubes are advantageously individually or in groups movable with a manipulator arranged outside the casting container.

At least two injection nozzles are advantageuosly movably arranged next to one another in a manner such that they may intersect with respect to the longitudinal direction of the casting gap.

Further advantages and individual features of the invention result from the subsequent description of one embodiment example and from the drawings. There are shown in

DETAILED DESCRIPTION OF THE INVENTION

Figure 1:
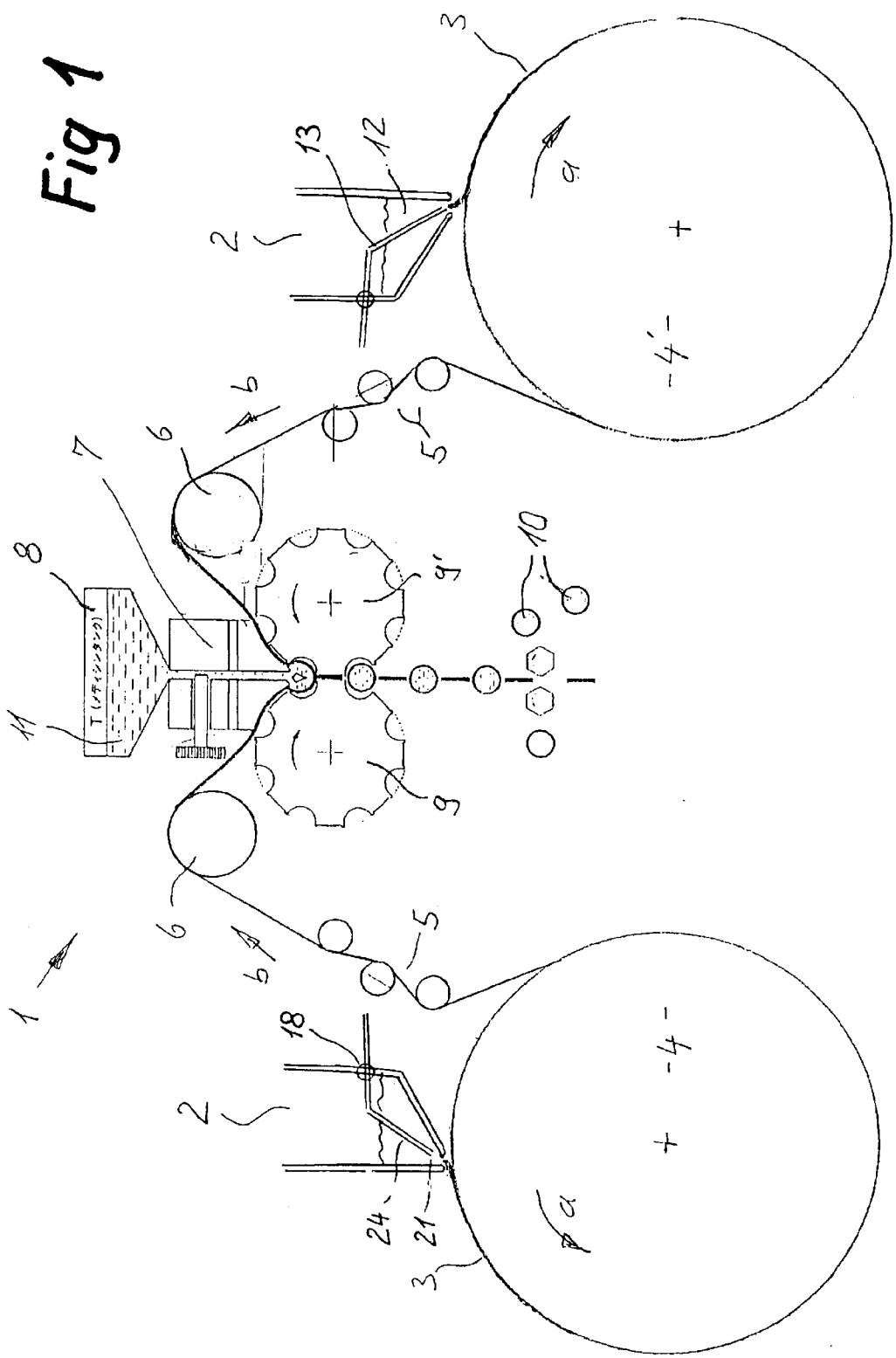
FIG. 1 a schematic representation of an encapsulating machine according to the rotary die method, FIG. 2 a cross section through a casting container, FIG. 3 a casting container according to FIG. 2 in a perspective representation, FIG. 4 a schematic representation of the movement possibility of the injection nozzles and FIGS. 5 to 10 various embodiment examples of possible patterns on a strip.

FIG. 1 shows schematically an encapsulating machine 1 which functions according to the rotary die method known for many years. For the technology of this method Fahrig et al. (Publisher) "Die Kapsel" Stuttgart 1983 is referred to. From gelatine supply containers not described in detail here an approx. 60° C. warm gelatine mass flows to the strip casting devices 2, 2' which are located over the cooling drums 4, 4' on both sides of the actual encapsulation unit. As described in more detail later, from each strip casting device a strip 3, 3' consisting of a first mass 12 and of a second mass 13 may be cast onto a cooling drum rotating in the arrow direction a. The gelatine strip may with this have a thickness of approx. 0.5 to 1.0 mm. On the cooling drum the strip cools and with this obtains a rubber-like, elastic consistence.

Each strip 3, 3 is led over oil rollers 5 in the arrow direction b which provide the surface with a film of oil. Deflection rollers 6 lead the strips then into the feed region of the moulding rollers 9, 91 which rotate in opposite directions and which weld the two strips together into capsules 10. The filling material 11 is introduced from a filling material container 8 via the so-called filling key 7 into the mould cavity before the two strips are pressed together.

In this manner individually metered capsules of a different shape and size may be manufactured in a continous method. It may with this be the case of capsules for pharmaceutical or dietry uses. But also capsules for technical purposes e.g. capsules filled with detergent or capsules filled with coloring (paint balls) may be produced in this manner. With this the strip need not compellingly be supplied to the encapsulating method online. It would also be conceivable to manufacture and roll up a strip in order to process it at a later point in time. With the cooling device it need not compelling be the case of a cooling drum. Conceivable would also be the casting onto a cooled conveyor belt or even the casting into a cooling bath.

Figure 2:
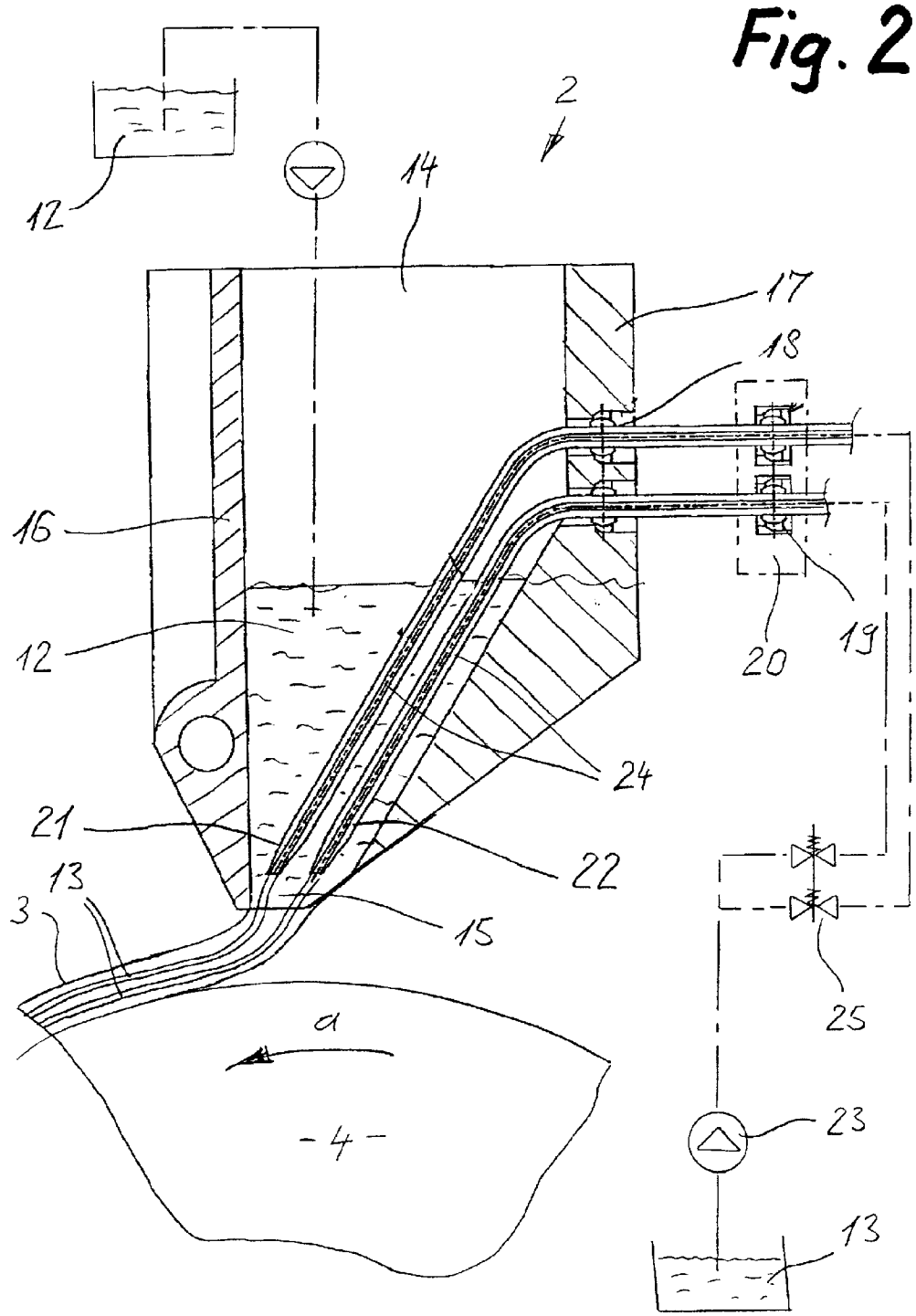
Figure 5:
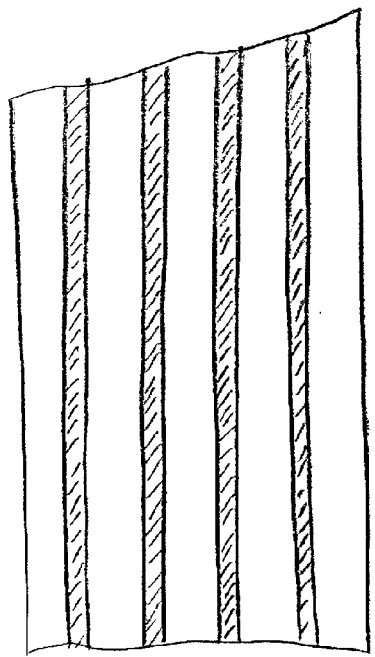
Figure 6:
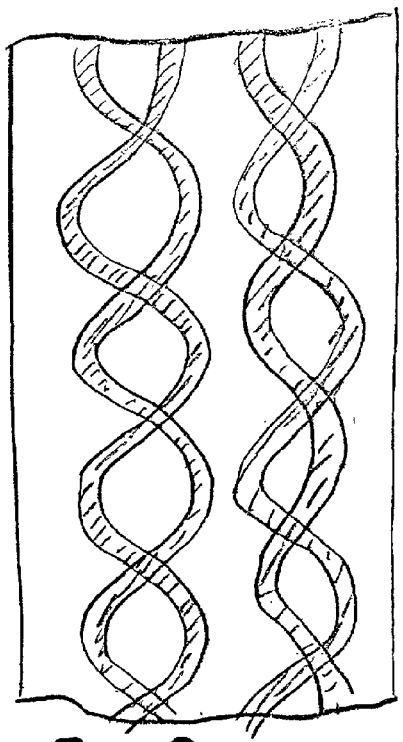

The FIGS. 2 and 3 show details of the strip casting device 2 according to the invention. The casting container 14 or the so-called "spreader box" consists preferably of a movable adjusting wall 16 and a fixed side wall 17. In this manner a casting gap 15 with the length L and with an adjustable width B may defined. In the longitudinal direction of the casting gap there are arranged several injection nozzles 21, 22 next to one another, wherein these form two rows which with respect to the width B of the casting gap or to the advance direction of the strip 3 lie behind one another. Each injection nozzle is arranged at the end of a supply tube 24 which is bent up somewhat and which penetrates through the fixed side wall 17. Each supply tube is at the same time separately mounted in a ball-and-socket bearing 18.

At a distance to the fixed sidewall 17 the supply tubes are held in a manipulator 20 and here are likewise guided in joint bearings 19. The two rows 21 and 22 of injection nozzles may at the same time be held in separate manipulators, it would even be conceivable for each injection nozzle to be individually manipulated. As is indicated in FIG. 3, the manipulator 20 may move the supply tubes 24 and thus the individual injection nozzles 21, 22 in various spacial axes 26. The manipulator could at the same time be connected to a programmable computer, which controls the individual movement sequences.

The manipulator is for example in the position of moving the nozzles in opposite directions in a manner such that they intersect. This is schematically shown in FIG. 4. The injection nozzles 21, 22 at the same time execute pivoting movements in opposite directions, wherein the path of the ejected masses intersects.

According to FIG. 2 the first mass 12 is pumped into the casting container 14 in a manner such that the level lies below the joint 18. The second mass 13 for example via a metering pump 23 and/or metering valves 25 gets into the supply tubes 24. At the same time it would also be possible to feed the two rows of injection nozzles 21, 22 with different masses or in each case to switch between two different masses.

Directly at the exit of the injection nozzles 21, 22 the two masses 12 and 13 unify into a single casting flow which leaves the casting container through the casting gap 15 and as a homogeneous strip 3 reaches the cooling drum 4.

Figure 7:
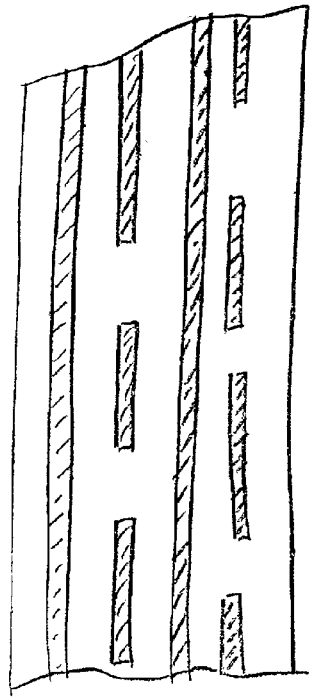
Figure 8:
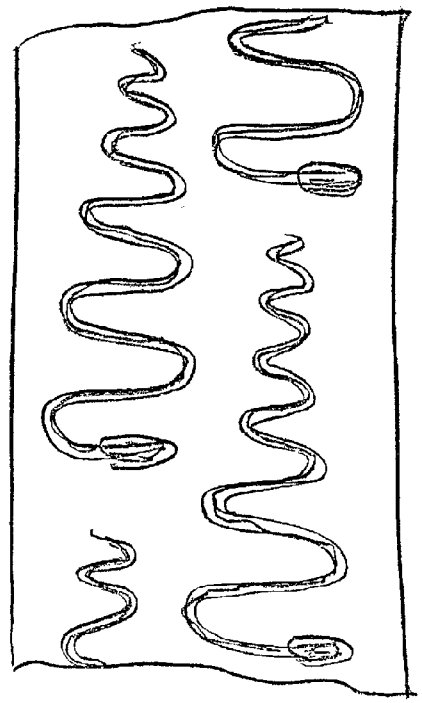
Figure 9:
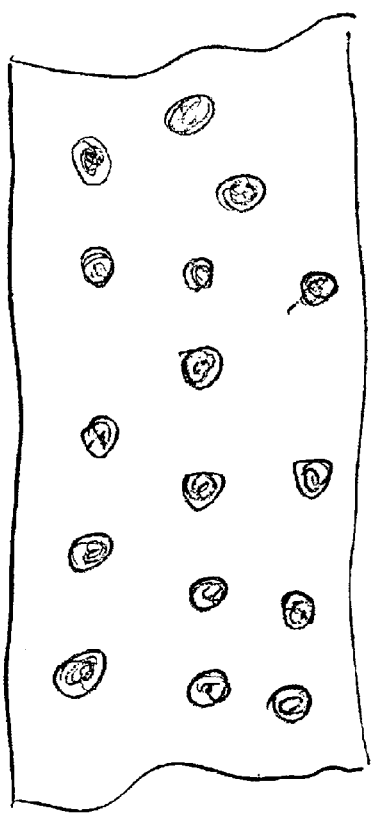
Figure 10:
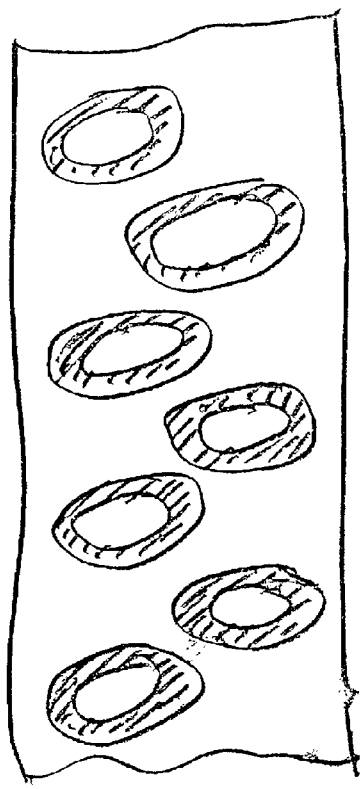

The FIGS. 5 to 10 show merely by way of example the variety of possible patterns which may be drawn onto a strip with the method according to the invention or with the device. Apart from simple parallel strips of the same or different color according to FIG. 5, one may also produce strip patterns interlaced in one another according to FIG. 6. FIG. 7 shows a pattern with continuous and with interrupted strips. FIG. 8 shows a pattern with symbolic snakes which is manufactured in that at the beginning as a snake head a relatively large quantity of the second mass is ejected and that subsequently with a reduced ejection a reducing snake line is drawn. According to FIG. 9 the second mass may also be drawn point-like into the strip, wherein the points may also be set such that they partly unify into a leopard pattern. With suitable consideration of the flow speed, according to FIG. 10 also circular or elliptical patterns may be drawn.

What is claimed is:

1. A device for manufacturing a flexible strip of at least two different masses of a biopolymer flowable with the addition of heat, comprising a casting container which comprises at least one casting gap for pouring out at least one first mass and comprising a feed device arranged within the casting container, for at least one second mass, and further comprising a cooling device under the casting gap wherein the two masses in the flowable condition are together poured out onto the cooling device in a manner such that they form a certain pattern on the strip, wherein the feed device for the second mass is at least one injection nozzle whose opening opens out in a region within the casting gap in a manner such that the second material can be enveloped by the first material, the injection nozzle being movably mounted in the casting container; and wherein at least one injection nozzle or several injection nozzles are arranged at ends of feed tubes which are led through a side wall of the casting container and are linkedly mounted on this, the feed tubes being movable individually or in groups with a manipulator arranged outside the casting container.

2. A device according to claim 1, wherein the second mass is intermittently ejectable out of an injection nozzle by way of a metering device.

3. A device according to claim 1, wherein with respect to a longitudinal direction of the casting gap several injection nozzles are arranged next to one another in the casting container which are movable simultaneously or individually.

4. A device according to claim 1, wherein with respect to a width of the casting gap at least two injection nozzles are arranged next to one another.

5. A device according to claim 3, with which with respect to a width of the casting gap there are arranged at least two injection nozzles, and wherein at least two injection nozzles are movably arranged next to one another in a manner such that they are capable of intersecting with respect to the longitudinal axis of the casting gap.

6. A device according to claim 1, wherein the opening of the injection nozzle is displaced back relative to the plane of the casting gap.

7. A device according to claim 1 in combination with a further said device wherein the cooling machine of each device is a cooling drum and further comprising an encapsulation machine with a pair of moulding rollers rotatable in opposite directions and being able to join the flexible strips as received from the cooling drums in order to form capsules.

8. A device for manufacturing a flexible strip of at least two different masses of a biopolymer flowable with the addition of heat, comprising a casting container which comprises at least one casting gap for pouring out at least one first mass and comprising a feed device arranged within the casting container, for at least one second mass, and further comprising a cooling device under the casting gap wherein the two masses in the flowable condition are together poured out onto the cooling device in a manner such that they form a certain pattern on the strip, wherein the feed device for the second mass is at least one injection nozzle whose opening opens out in a region within the casting gap in a manner such that the second material can be enveloped by the first material;

wherein with respect to a longitudinal direction of the casting gap several injection nozzles are arranged next to one another in the casting container which are movable simultaneously or individually; and with respect to a width of the casting gap there are arranged at least two injection nozzles, and wherein at least two injection nozzles are movably arranged next to one another in a manner such that they are capable of intersecting with respect to the longitudinal axis of the casting gap.

9. A device according to claim 8, wherein the second mass is intermittently ejectable out of an injection nozzle by way of a metering device.

10. A device according to claim 8, wherein the injection nozzle is movably mounted in the casting container.

11. A device according to claim 10, wherein with respect to the width of the casting gap said at least two injection nozzles are arranged next to one another.

12. A device according to claim 10, wherein at least one injection nozzle or several injection nozzles are arranged at ends of feed tubes which are led through a side wall of the casting container and are linkedly mounted on this.

13. A device according to claim 12, wherein the feed tubes are movable individually or in groups with a manipulator arranged outside the casting container.

14. A device according to claim 8, wherein the opening of the injection nozzle is displaced back relative to the plane of the casting gap.

15. A device according to claim 8 in combination with a further said device wherein the cooling machine of each device is a cooling drum and further comprising an encapsulation machine with a pair of moulding rollers rotatable in opposite directions and being able to join the flexible strips as received from the cooling drums in order to form capsules.

* * * * *